US012578233B2

(12) United States Patent
Sasaki

(10) Patent No.: US 12,578,233 B2
(45) Date of Patent: Mar. 17, 2026

(54) TEMPERATURE SENSOR

(71) Applicant: SHIBAURA ELECTRONICS CO., LTD, Saitama (JP)

(72) Inventor: Shohei Sasaki, Semboku City (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 264 days.

(21) Appl. No.: 18/553,778

(22) PCT Filed: Dec. 6, 2021

(86) PCT No.: PCT/JP2021/044698
§ 371 (c)(1),
(2) Date: Oct. 3, 2023

(87) PCT Pub. No.: WO2022/244284
PCT Pub. Date: Nov. 24, 2022

(65) Prior Publication Data
US 2024/0361186 A1 Oct. 31, 2024

(30) Foreign Application Priority Data
May 19, 2021 (JP) ................................. 2021-084266

(51) Int. Cl.
*G01K 1/08* (2021.01)
*G01K 1/14* (2021.01)
*G01K 7/22* (2006.01)

(52) U.S. Cl.
CPC ................. *G01K 1/08* (2013.01); *G01K 1/14* (2013.01); *G01K 7/22* (2013.01)

(58) Field of Classification Search
CPC ............... G01K 1/08; G01K 1/14; G01K 7/22
(Continued)

(56) References Cited

U.S. PATENT DOCUMENTS

2007/0119235 A1 5/2007 Matsuo et al.
2012/0063488 A1* 3/2012 Nakayama ............... G01K 1/10
374/185
(Continued)

FOREIGN PATENT DOCUMENTS

CN 1133435 A 10/1996
CN 1860362 A 11/2006
(Continued)

OTHER PUBLICATIONS

International Search Report for PCT/JP2021/044698 dated May 19, 2021.
(Continued)

*Primary Examiner* — Mirellys Jagan
(74) *Attorney, Agent, or Firm* — McDonald Hopkins LLC

(57) ABSTRACT
A temperature sensor eliminates the necessity of removing a filler in order to check the condition of a thermosensitive body, while retaining the position of the thermosensitive body relative to a protective tube. The temperature sensor includes: a sensor element including the thermosensitive body, a protective layer made of glass and surrounding the thermosensitive body, and a lead wire electrically connected to the thermosensitive body; a protector including the protective tube in which the thermosensitive body is housed; and a retainer mechanically retaining a position of the thermosensitive body relative to the protective tube inside the protective tube.

5 Claims, 9 Drawing Sheets

(58) Field of Classification Search
USPC ........................................................ 374/208
See application file for complete search history.

(56) References Cited

U.S. PATENT DOCUMENTS

| | | | |
|---|---|---|---|
| 2013/0186881 A1* | 7/2013 | Nakayama | A47J 37/00 |
| | | | 219/494 |
| 2013/0208765 A1 | 8/2013 | Takahashi et al. | |
| 2019/0120697 A1 | 4/2019 | Suzuki et al. | |
| 2020/0182708 A1 | 6/2020 | Yoshihara et al. | |
| 2020/0264052 A1 | 8/2020 | Taira et al. | |
| 2021/0404882 A1 | 12/2021 | Suzuki | |
| 2023/0096651 A1* | 3/2023 | Reuvers | G01K 7/22 |
| | | | 374/185 |

FOREIGN PATENT DOCUMENTS

| | | | |
|---|---|---|---|
| CN | 101311691 A | 11/2008 | |
| CN | 104977344 A | 10/2015 | |
| CN | 108332868 A | 7/2018 | |
| CN | 109073473 A | 12/2018 | |
| CN | 109073477 A | 12/2018 | |
| CN | 111578982 A | 8/2020 | |
| CN | 111615622 A | 9/2020 | |
| JP | 3035834 U | 1/1997 | |
| JP | 2001343292 A | 12/2001 | |
| JP | 2012042451 A | 3/2012 | |
| JP | 201293340 A | 5/2012 | |
| JP | 2015152336 A | 8/2015 | |
| JP | 2015194352 A | 11/2015 | |
| JP | 2020134506 A | 8/2020 | |
| JP | 2022177865 A | 12/2022 | |
| JP | 7578746 B2 * | 11/2024 | .......... A47J 37/0664 |

OTHER PUBLICATIONS

Written Opinion for PCT/JP2021/044698 dated May 19, 2021.
Chinese Office action for application No. 202180094534.3 dated May 5, 2024.
Japanese Office action for application No. JP2024-020757 dated Apr. 23, 2024.

* cited by examiner

FIG. 5A
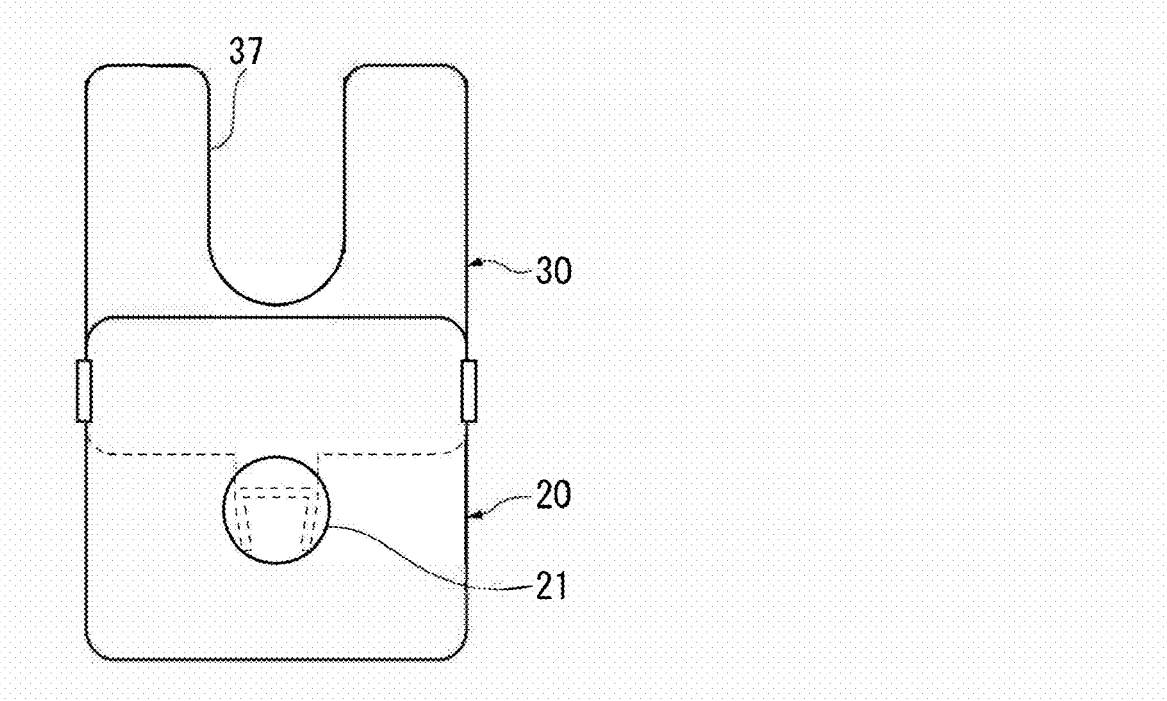
FIG. 5B
FIG. 5C
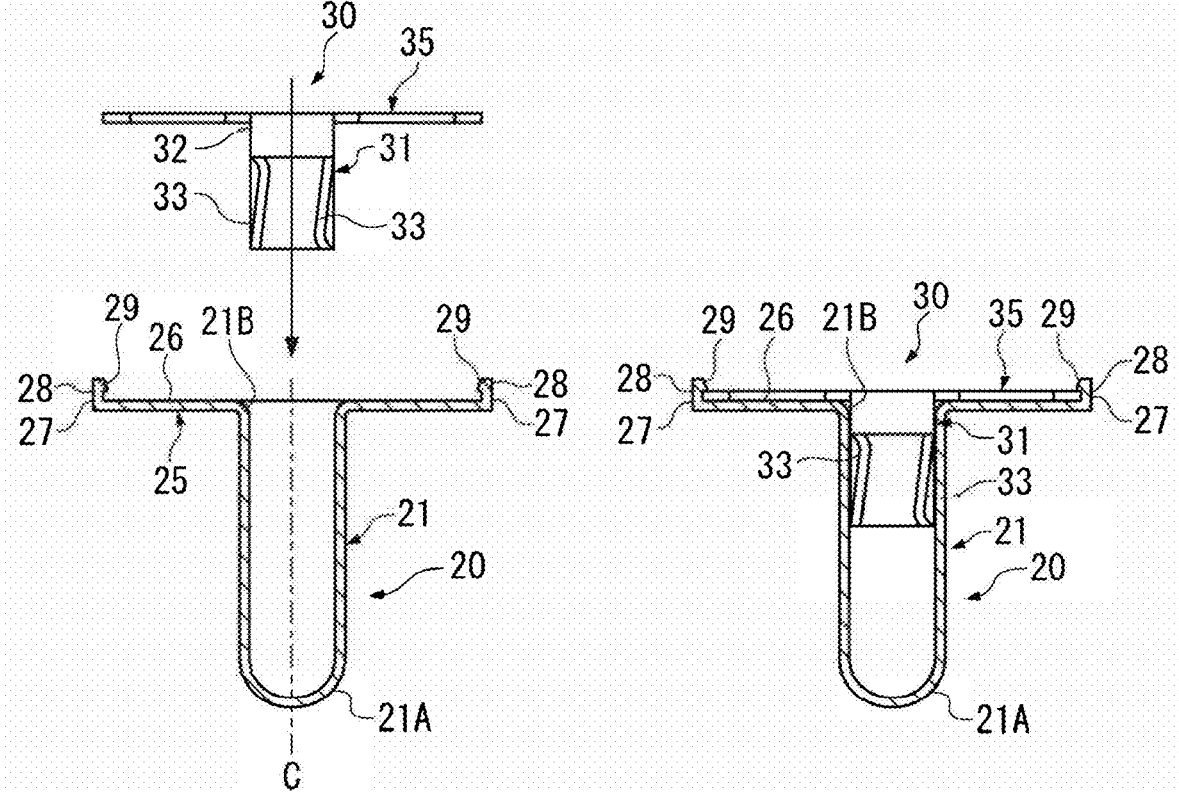

FIG. 6A
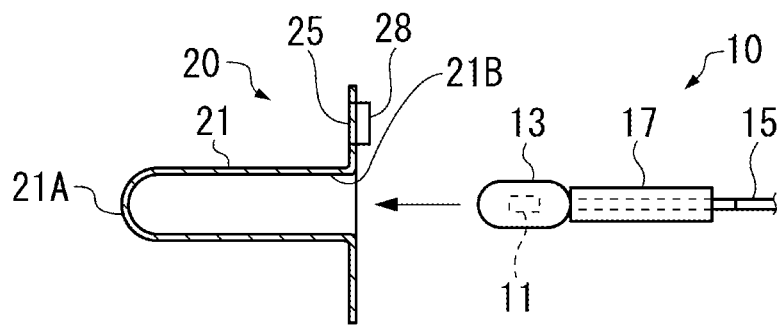
FIG. 6B
FIG. 6C
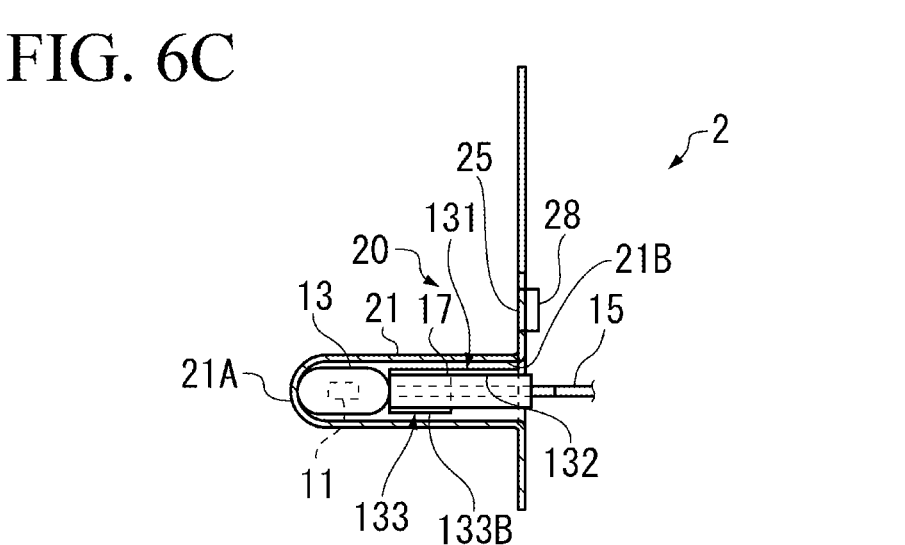

TEMPERATURE SENSOR

CROSS-REFERENCE TO RELATED APPLICATIONS

This is the National Stage of PCT international application PCT/JP2021/044698 filed on Dec. 6, 2021, which claims priority of Japanese Application No. 2021-084266, filed May 19, 2021, both of which are incorporated herein by reference in their entirety.

TECHNICAL FIELD

The present invention relates to a temperature sensor using a thermosensitive body, for example, a thermistor.

BACKGROUND ART

This type of temperature sensor includes a thermosensitive body and a protective tube housing the thermosensitive body. The protective tube is made of a heat-resistant metal material, for example, stainless steel. In this type of temperature sensor, a filler is present between the thermosensitive body and the protective tube, and the thermosensitive body is surrounded by the filler. Heat-resistant particles, for example, alumina particles (Patent Literature 1, for example) or heat-resistant resin, for example, epoxy resin (Patent Literature 2, for example) is used as the filler. The filler fixes and retains the position of the thermosensitive body relative to the protective tube.

CITATION LIST

Patent Literature

Patent Literature 1: JP 2015-152336 A
Patent Literature 2: JP 2020-134506 A

SUMMARY OF INVENTION

Technical Problem

However, when abnormality occurs in the temperature measured by the temperature sensor, it is necessary to remove the filler by which the thermosensitive body is surrounded in order to check the condition of the thermosensitive body.

Thus, it is an object of the present invention to provide a temperature sensor that eliminates the necessity of removing a filler in order to check the condition of a thermosensitive body, while retaining the position of the thermosensitive body relative to a protective tube.

Solution to Problem

A temperature sensor of the present invention includes: a sensor element including a thermosensitive body, a protective layer made of glass and surrounding the thermosensitive body, and a lead wire electrically connected to the thermosensitive body; a protector including a protective tube in which the thermosensitive body is housed; and a retainer mechanically retaining a position of the thermosensitive body relative to the protective tube inside the protective tube.

In the temperature sensor of the present invention, preferably, if the sensor element includes an electrical insulation tube covering the lead wire, the retainer can fix the position of the thermosensitive body relative to the protective tube by retaining the electrical insulation tube by pressure-bonding.

In the temperature sensor of the present invention, preferably, the protector made of a metal material preferably includes the protective tube and a first supporting portion continuous to a proximal end of the protective tube having an opening, and the retainer made of a metal material includes a retaining portion retaining the electrical insulation tube by pressure-bonding and a second supporting portion supporting the retaining portion.

In the temperature sensor of the present invention, preferably, the retainer is pressed against the protective layer provided inside the protective tube and including the thermosensitive body.

In the temperature sensor of the present invention, preferably, the protector made of a metal material includes the protective tube and a first supporting portion continuous to a proximal end of the protective tube having an opening, and the retainer made of a resin material includes a retaining portion pressed against the protective layer including the thermosensitive body and a second supporting portion supporting the retaining portion and integrally formed with the retaining portion.

In the temperature sensor of the present invention, preferably, the retainer includes a retaining tube made of an electrically insulating material, provided inside the protective tube and penetrated by the lead wire, and the retaining tube is pressure-bonded to the protective tube.

In the temperature sensor of the present invention, preferably, the protector made of a metal material includes the protective tube and a first supporting portion continuous to a proximal end of the protective tube having an opening, and the retainer includes a first member and a second member. The first member includes a first retaining tube pressed against the protective layer including the thermosensitive body. The second member includes a second retaining tube pressing the first retaining tube against the protective layer and a second supporting portion supporting the second retaining tube.

Advantageous Effects of Invention

According to the present invention, a temperature sensor is provided that eliminates the necessity of removing a filler in order to check the condition of a thermosensitive body, while retaining the position of the thermosensitive body relative to a protective tube.

BRIEF DESCRIPTION OF DRAWINGS

FIG. 5A, FIG. 5B and FIG. 5C each show a combination of the protector and the retainer according to the first embodiment, FIG. 5A being a plan view, FIG. 5B being a side-sectional view before combination, and FIG. 5C being a partial side-sectional view after combination.

FIGS. 6A to 6C shows a procedure of manufacturing a temperature sensor according to a second embodiment of the present invention.

DESCRIPTION OF EMBODIMENTS

In the following, first to fourth embodiments according to the present invention will be described with reference to the accompanying drawings.

First Embodiment: FIGS. 1A, 1B, FIGS. 2A to 2C, FIGS. 3A to 3C, FIGS. 4A to 4D, FIGS. 5A to 5C

Figure 1A:
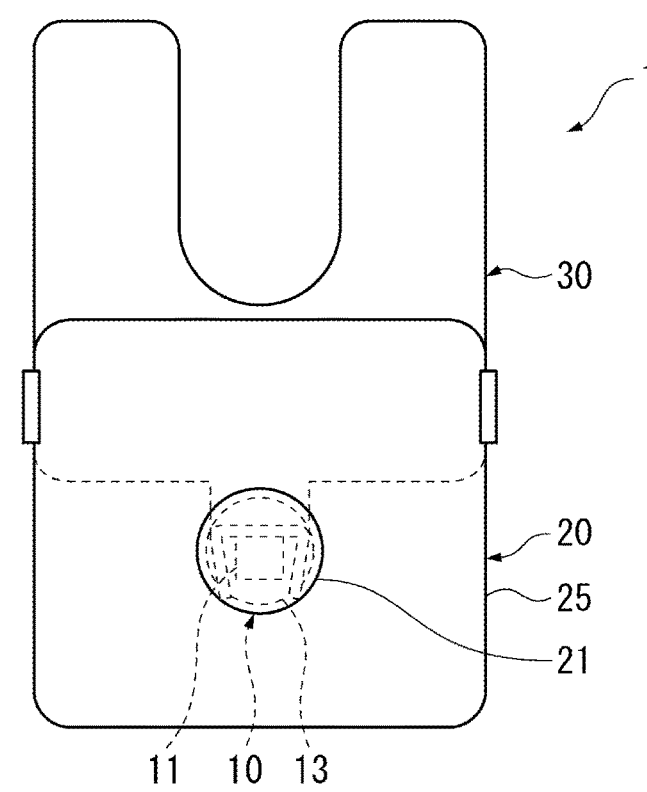
FIG. 1A and FIG. 1B each show a temperature sensor according to a first embodiment of the present invention, FIG. 1A being a plan view and FIG. 1B being a partial side-sectional view.
Figure 1B:
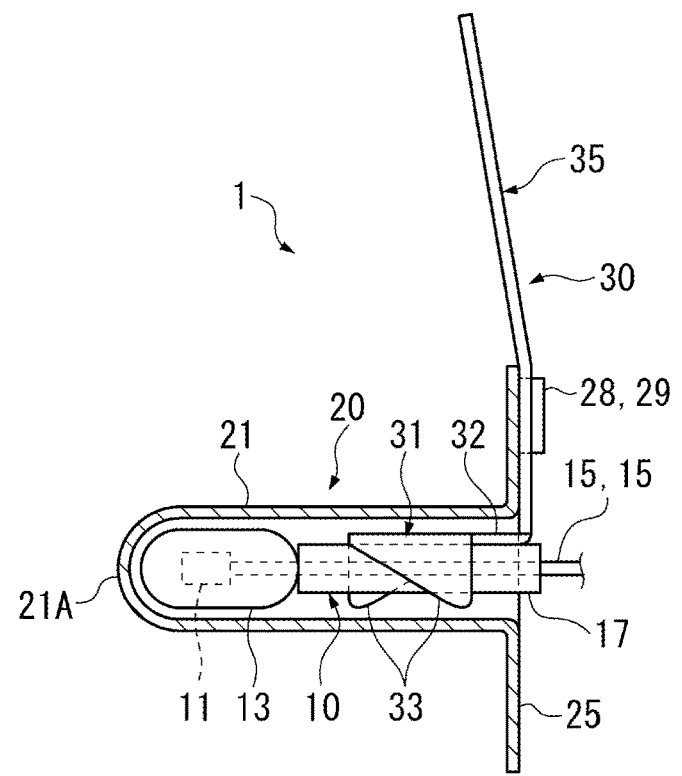

As shown in FIGS. 1A, 1B, a temperature sensor 1 according to a first embodiment includes: a sensor element 10; a protector 20 housing a main part of the sensor element 10; and a retainer 30 fixed to the protector 20 while retaining the sensor element 10. In the temperature sensor 1, the retainer 30 serves to fix the positional relationship between the sensor element 10 and the protector 20. In the following, elements of the temperature sensor 1 will be described in order, and then a procedure of manufacturing the temperature sensor 1 will be mentioned.

[Sensor Element 10: FIGS. 1A, 1B]

As shown in FIGS. 1A, 1B, the sensor element 10 includes: a thermosensitive body 11; a protective layer 13 made of glass, for example, and covering the thermosensitive body 11; a pair of lead wires 15, 15 electrically connected to the thermosensitive body 11; and an electrical insulation tube 17 housing the lead wires 15, 15.

[Thermosensitive Body 11]

For example, a thermistor is preferably used as the thermosensitive body 11. A thermistor is an abbreviation of thermally sensitive resistor, and is a metal oxide for detecting temperature by utilizing the property of undergoing changes in its electrical resistance with temperature.

Thermistors are divided into NTC (negative temperature coefficient) thermistors and PTC (positive temperature coefficient) thermistors, and both types of thermistors can be used for the present invention.

Thermistors usually have a rectangular shape, and are provided with electrode films of gold plating, for example, on both of opposite top and bottom surfaces. The lead wires 15, 15 are electrically connected to the thermistor via the electrode films.

[Protective Layer 13]

As shown in FIGS. 1A, 1B, the protective layer 13 made of glass seals the thermosensitive body 11 and retains the thermosensitive body 11 in an airtight state, thereby preventing the occurrence of chemical and physical changes of the thermosensitive body 11 due to surrounding environmental conditions in which the sensor element 10 is used, and mechanically protecting the thermosensitive body 11.

The protective layer 13 made of glass covers the entire thermosensitive body 11 as well as distal end portions of the lead wires 15, 15, and seals the lead wires 15, 15.

[Lead Wires 15, 15]

The lead wires 15, 15 applied to the sensor element 10 are electrically connected to a pair of electrode films of the thermosensitive body 11, which are not shown, respectively.

Since the lead wires 15, 15 are sealed by the protective layer 13 made of glass, Dumet wires, which have a linear expansion coefficient close to that of glass, are preferably used. Dumet wires are electrical wires having an electrical conductor core of alloy mainly containing iron and nickel, covered by copper.

[Electrical Insulation Tube 17]

The electrical insulation tube 17 is provided to cover the lead wires 15, 15 so as to protect the lead wires 15, 15. In addition, the electrical insulation tube 17 is retained by pressure-bonding by retaining pieces 33, 33 of the retainer 30 while covering the lead wires 15, 15.

An electrically insulating material such as silicone rubber, a typical example of which is a glass braid silicone rubber tube, is used as the electrical insulation tube 17. The electrical insulation tube 17 has elasticity relative to the retaining pieces 33, 33 pressure-bonded to it, so that reliable retention is achieved by pressure-bonding.

[Protector 20: FIGS. 1A, 1B, FIGS. 2A to 2C]

Next, as shown in FIGS. 1A, 1B and FIGS. 2A to 2C, the protector 20 includes: a protective tube 21 housing a main part of the sensor element 10; and a supporting portion (first supporting portion) 25 continuous to a proximal end of the protective tube 21. The protective tube 21 and the supporting portion 25 can be integrally formed from a metal material, or may be produced separately and then integrated with each other by a bonding means such as welding. The metal material used is, for example, an iron-based material such as stainless steel with excellent corrosion resistance, or, in the case of focusing on heat conductivity, copper or copper alloy. These points similarly apply to the retainer 30.

Figure 2A:
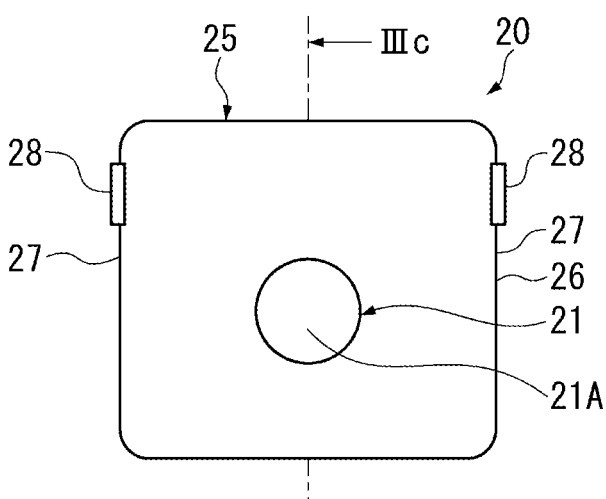
FIG. 2A, FIG. 2B and FIG. 2C each show a protector alone according to the first embodiment, FIG. 2A being a plan view, FIG. 2B being a partial side-sectional view, and FIG. 2C being a sectional view taken along a line IIIc-IIIc from FIG. 2A.
Figure 2C:
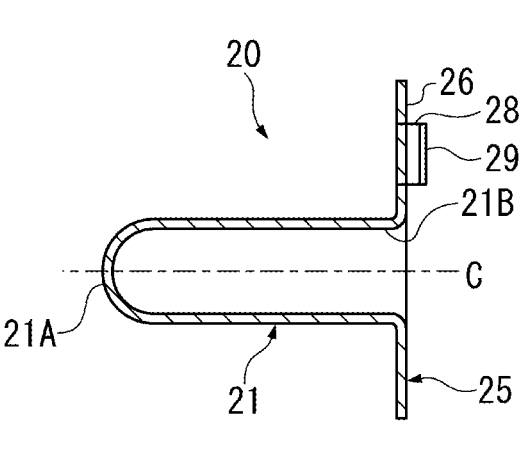
Figure 2B:
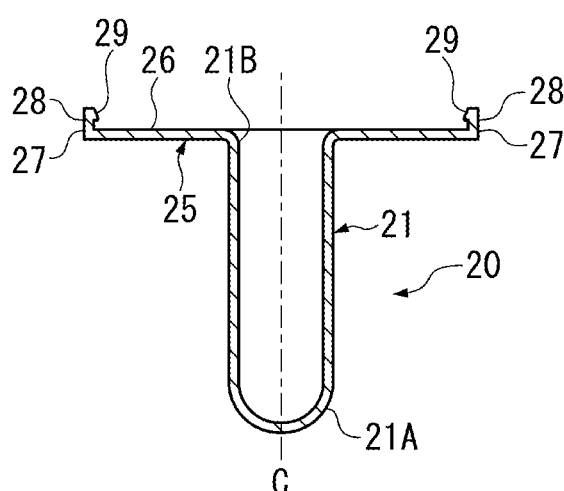

The protective tube 21 has a cylindrical structure with a closed end 21A on one side and an open end 21B on the other side in the direction of a central axis C shown in FIGS. 2A to 2C. In this embodiment, the protective tube 21 is illustrated as having a cylindrical shape, which is a typical example of a tubular shape. However, other shapes of the protective tube 21 than a cylinder such as a rectangular tube are not excluded as long as the main part of the sensor element 10 can be housed. Note that the distal end is defined as being on the side of the protector 20 where the closed end 21A is provided.

The supporting portion 25 includes: a supporting piece 26 in the form of a flat plate and having a rectangular shape in plan view; and a pair of retaining pieces 28, 28 provided on opposing peripheral edges 27, 27 of the supporting piece 26.

The supporting piece 26 is lapped over a supporting portion 35 (second supporting portion) of the retainer 30, which will be described next. The retaining pieces 28, 28 retain the lapped supporting portion 35. As a retention means, locking claws 29, 29 protruding in opposing directions are provided at respective distal ends of the retaining pieces 28, 28. The supporting portion 35 is retained by sandwiching the supporting portion 35 between the locking claws 29, 29 and the supporting piece 26. The locking claws 29, 29 are merely an example, and the supporting portion 35 may be pressure-bonded by bending the retaining pieces 28, 28 without the locking claws 29, 29. A member corresponding to the retaining pieces 28, 28 can also be provided on the supporting portion 35 side.

[Retainer 30: FIGS. 1A, 1B, FIGS. 3A to 3C]

As shown in FIGS. 1A, 1B and FIGS. 3A to 3C, the retainer 30 includes: a retaining portion 31 retaining the electrical insulation tube 17 of the sensor element 10 by pressure-bonding; and a supporting portion 35 supporting the retaining portion 31.

The retaining portion 31 includes: a flat plate-shaped connecting piece 32 continuous to the supporting portion 35; and a pair of retaining pieces 33, 33 provided on both sides in a width direction of the connecting piece 32. In the retaining portion 31, the connecting piece 32 and the retaining pieces 33, 33 surround the lead wires 15, 15 of the sensor element 10, and the retaining pieces 33, 33 are bent to retain the electrical insulation tube 17 by pressure-bonding. Thus, the lead wires 15, 15 are retained by the retaining portion 31 via the electrical insulation tube 17, so that the position of the sensor element 10 is fixed relative to the retainer 30.

Figure 3A:
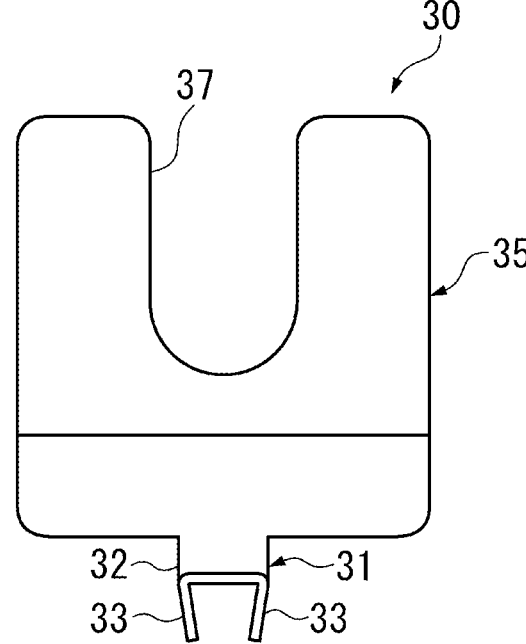
FIG. 3A, FIG. 3B and FIG. 3C each show a retainer alone according to the first embodiment, FIG. 3A being a plan view, FIG. 3B being a front view, and FIG. 3C being a side view.
Figure 3C:
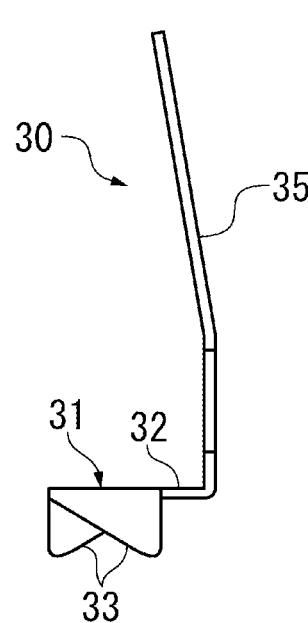
Figure 3B:
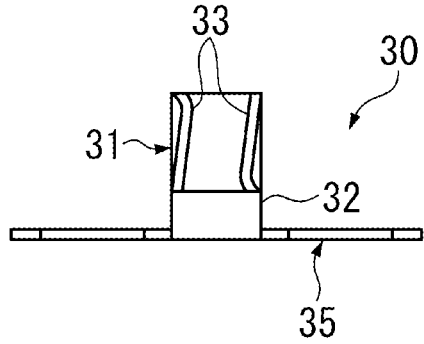

The supporting portion 35 supports the connecting piece 32 of the retaining portion 31 and is used when attaching the temperature sensor 1 to a target of temperature measurement. For this purpose, a U-shaped notch 37 in which a screw or the like is arranged is provided in this embodiment, but the notch 37 is not intended to limit the invention of the present invention. The supporting portion 35 is in the form of a flat plate and has a rectangular shape in plan view, and as shown in FIG. 3C, the connecting piece 32 rises approximately perpendicularly from the retaining portion 31. The supporting portion 25 of the protector 20 is lapped over the supporting portion 35 as described above, and they are fixed to each other. This fixation is easily performed by the locking claws 29, 29, as will be described in detail later.

[Procedure of Manufacturing Temperature Sensor 1: FIGS. 4A to 4D, FIGS. 5A to 5C]

Next, a procedure of manufacturing the temperature sensor 1 will be described with reference to FIGS. 4A to 4D and FIGS. 5A to 5C.

Figure 4A:
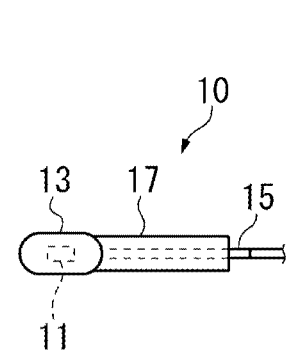
FIGS. 4A to 4D shows a procedure of manufacturing the temperature sensor according to the first embodiment.
Figure 4A:
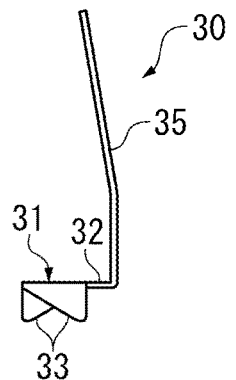
Figure 4B:
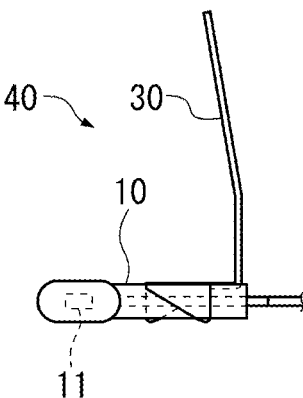
Figure 4C:
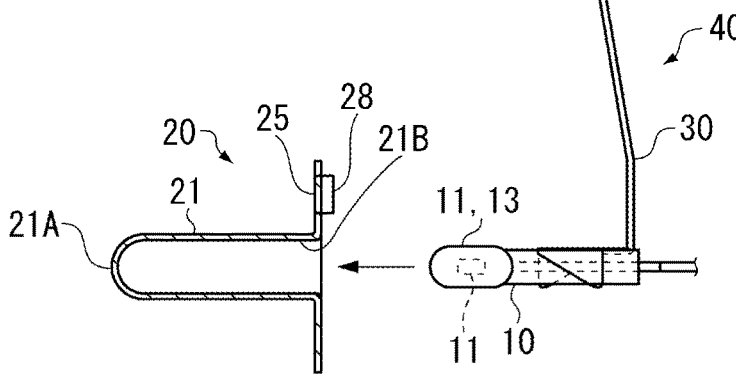
Figure 4D:
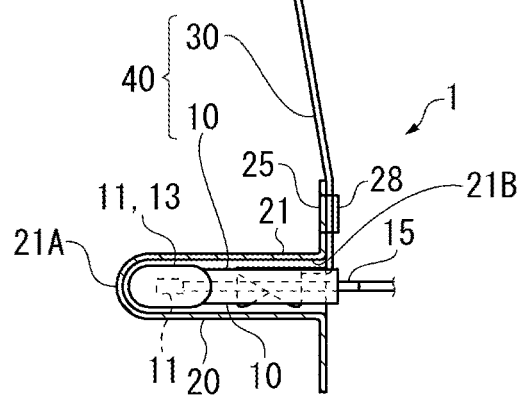

This manufacturing procedure is divided into a first step of retaining the sensor element 10 by the retainer 30 (FIG. 4A and FIG. 4B) and assembly of the retainer 30 retaining the sensor element 10 and the protector 20 (FIG. 4C and FIG. 4D).

[First Step: FIG. 4A, FIG. 4B]

The sensor element 10 and the retainer 30, which are produced separately, are aligned such that the lead wires 15, 15 and the electrical insulation tube 17 of the sensor element 10 are surrounded by the connecting piece 32 and the retaining pieces 33, 33 of the retainer 30. While the lead wires 15, 15 and the electrical insulation tube 17 are surrounded by the connecting piece 32 and the retaining pieces 33, 33, the retaining pieces 33, 33 are bent, and the lead wires 15, 15 and the electrical insulation tube 17 are pressure-bonded by the connecting piece 32 and the retaining pieces 33, 33. Thus, an assembly 40 of the sensor element 10 and the retainer 30 is obtained.

The connecting piece 32 and the retaining pieces 33, 33 sandwich the lead wires 15, 15 preferably at a position close to the protective layer 13 including the thermosensitive body 11. This is because, if the position of sandwiching is far from the protective layer 13, a region in which the lead wires 15, 15 may deflect is left between that position and the protective layer 13 including the thermosensitive body 11. On the other hand, if the retaining pieces 33, 33 are too close to the protective layer 13 made of glass, the glass can be damaged, and this is also advantageous with regard to voltage endurance. Therefore, most preferably, the pressure-bonding is performed by the connecting piece 32 and the retaining pieces 33, 33 such that there is an appropriate gap with the protective layer 13.

[Second Step: FIG. 4C, FIG. 4D, FIGS. 5A to 5C]

Next, the assembly 40 of the sensor element 10 and the retainer 30 is assembled with the protector 20. This assembly is performed by aligning the thermosensitive body 11 covered by the protective layer 13 of the sensor element 10 fixed to the retainer 30 with the open end 21B of the protective tube 21, and then inserting the sensor element 10 including the thermosensitive body 11 into the protective tube 21. When the thermosensitive body 11 is inserted to an innermost part of the protective tube 21, the supporting portion 25 of the protector 20 and the supporting portion 35 of the retainer 30 abut against each other, and further insertion is prevented. In this manner, the thermosensitive body 11 is arranged at a predetermined position. When the supporting portion 25 and the supporting portion 35 abut against each other, the supporting portion 35 of the retainer 30 is sandwiched between the supporting portion 25 and the locking claws 29, 29 of the protector 20, and the supporting portion 25 and the supporting portion 35 are thereby fixed to each other.

[Housing and Fixation of Sensor Element 10 by Protector 20: FIG. 1B]

As shown in FIG. 1B, in the temperature sensor 1 obtained in the above procedure, the protective layer 13 including the thermosensitive body 11 is arranged at a distal end of the protective tube 21. Although a gap is provided between the protective layer 13 and the closed end 21A in this figure, the protective layer 13 can be arranged in contact with the inner wall of the closed end 21A. In addition, the portion where the lead wires 15, 15 and the electrical insulation tube 17 are pressure-bonded by the connecting piece 32 and the retaining pieces 33, 33 is also housed inside the protective tube 21. The protective layer 13 including the thermosensitive body 11 housed inside the protective tube 21 is not covered by the filler and is exposed inside the protective tube 21.

[Effects Achieved by Temperature Sensor 1]

The temperature sensor 1 described above achieves the following effects.

In the temperature sensor 1, the lead wires 15, 15 and the electrical insulation tube 17 of the sensor element 10 are fixed and retained by the retainer 30 by pressure-bonding, and the supporting portion 35 of the retainer 30 is fixed by the supporting portion 25 of the protector 20. Therefore, the position of the protective layer 13 including the thermosensitive body 11 of the sensor element 10 is fixed relative to the protective tube 21 of the protector 20.

Moreover, the protective layer 13 including the thermosensitive body 11 housed inside the protective tube 21 is exposed. Therefore, it is possible to directly observe the protective layer 13 and the thermosensitive body 11 via the protective layer 13 by releasing the fixation of the supporting portion 35 by the locking claws 29, 29 and pulling out the assembly 40 of the sensor element 10 and the retainer 30 from the protector 20. In this manner, it is possible to easily check the thermosensitive body 11 and the protective layer 13 in the event of abnormality.

In addition, since the protective layer 13 including the thermosensitive body 11 housed inside the protective tube 21 is exposed and the filler of heat-resistant resin, for example, is not present around it, the following effects are achieved. That is, degradation in the voltage endurance properties is less likely to occur due to the absorption of atmospheric humidity by the heat-resistant resin, and in addition, the number of man-hours for preparation, cleaning after use, and care of the heat-resistant resin is reduced. Further, it is unnecessary to cure the heat-resistant resin, which results in the reduction of lead time, leading to the reduction of work in process. It takes more than ten hours to cure the heat-resistant resin. Further, the unnecessity of the heat-resistant resin enables the manufacture of the temperature sensor 1 to be automated. Furthermore, fixation of the sensor element 10 by pressure-bonding improves mechanical strength over fixation by the heat-resistant resin.

Second Embodiment: FIGS. 6A to 6C, FIGS. 7A to 7C

Next, a temperature sensor 2 according to a second embodiment will be described with reference to FIGS. 6A to 6C and FIGS. 7A to 7C. Note that, in FIGS. 6A to 6C and FIGS. 7A to 7C, the same components as those of the temperature sensor 1 are provided with the same reference characters as in FIGS. 1A, 1B to FIGS. 5A to 5C. The same applies to a third embodiment (FIGS. 8A to 8D) and a fourth embodiment (FIG. 9A to 9D), which will be described later.
[Differences from First Embodiment]
While the retainer 30 according to the first embodiment is made of a metal material, a retainer 130 according to the second embodiment is made of a resin material. In addition, while in the first embodiment the retaining portion 31 of the retainer 30 retains the lead wires 15, 15 and the electrical insulation tube 17 of the sensor element 10 by pressure-bonding, a retaining portion 131 of the retainer 130 performs retention by pressing the thermosensitive body 11 against the inner surface of the closed end 21A of the protective tube 21. The retainer 130 having these features has the configurations described below.
[Characteristic Configurations of Temperature Sensor 2: FIGS. 6A to 6C, FIGS. 7A to 7C]
As shown in FIGS. 6A to 6C and FIGS. 7A to 7C, the retainer 130 of the temperature sensor 2 includes: a retaining portion 131 performing retention by pressing the thermosensitive body 11 of the sensor element 10 against the inner surface of the closed end 21A of the protective tube 21; and a supporting portion 135 supporting the retaining portion 131.

Figure 7A:
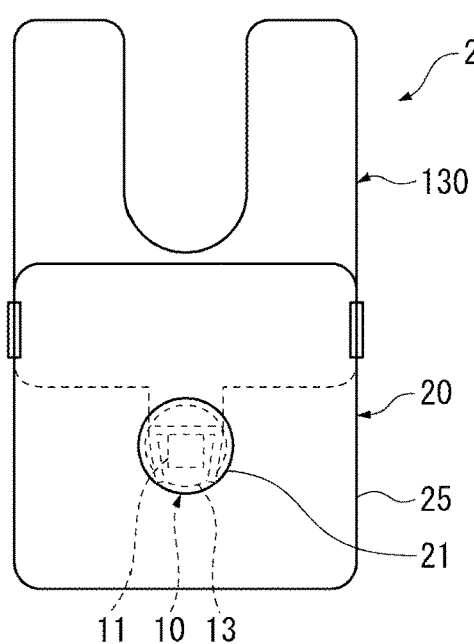
FIG. 7A, FIG. 7B and FIG. 7C each show the temperature sensor according to the second embodiment, FIG. 7A being a plan view, FIG. 7B being a partial side-sectional view before combination, and FIG. 7C being a partial side-sectional view after combination.
Figure 7B:
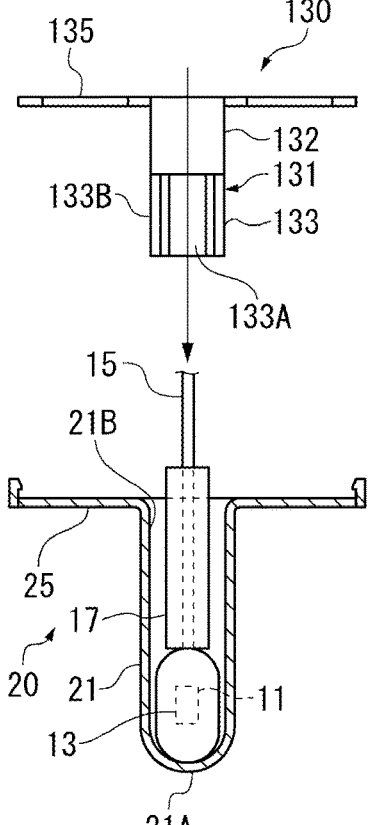
Figure 7C:
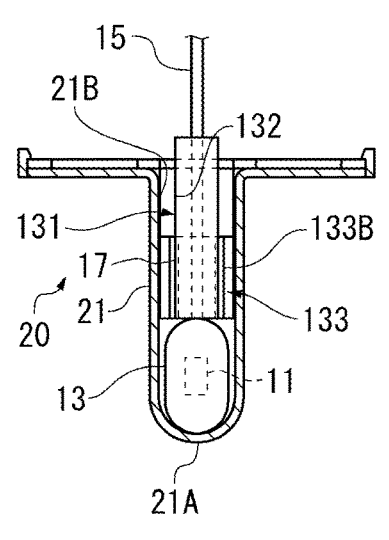

The retaining portion 131 includes: a flat plate-shaped connecting piece 132 continuous to the supporting portion 135; and a retaining tube 133 provided on a distal end side of the connecting piece 132. As shown in FIG. 7B and FIG. 7C, when the retaining tube 133 is inserted into the protective tube 21 of the protector 20, the retaining tube 133 abuts against the protective layer 13, and the protective layer 13 including the thermosensitive body 11 is thereby pressed against the inner surface of the closed end 21A of the protective tube 21. In this manner, the sensor element 10 is retained with its position fixed relative to the retainer 130. In addition, the retaining tube 133 is arranged to cover the electrical insulation tube 17.

As shown in FIG. 7B and FIG. 7C, the retaining tube 133 includes: a lead wire chamber 133A through which the lead wires 15, 15 and the electrical insulation tube 17 penetrate; a tube 133B surrounding the lead wire chamber 133A. In a state where the retaining tube 133 presses against the protective layer 13 of the sensor element 10, the lead wires 15, 15 are housed in the lead wire chamber 133A, and a distal end of the tube 133B abuts against the protective layer 13.

[Procedure of Manufacturing Temperature Sensor 2: FIGS. 6A to 6C]
The temperature sensor 2 is manufactured in the following procedure.
First, as shown in FIG. 6A and FIG. 6B, the sensor element 10 is inserted into the protective tube 21 of the protector 20. At this point, the protective layer 13 is not fixed yet.
Next, as shown in FIG. 6B and FIG. 6C, the retainer 130 is assembled to the protector 20. This assembly is performed by inserting the retaining portion 131 of the retainer 130 into the protective tube 21 of the protector 20. During this insertion, alignment is performed such that the lead wires 15, 15 are arranged inside the lead wire chamber 133A.
When the retaining portion 131 is inserted into the protective tube 21 to an innermost part where the tube 133B is pressed against a rear end of the protective layer 13, the supporting portion 25 of the protector 20 and the supporting portion 135 of the retainer 130 abut against each other, and further insertion is prevented. When the supporting portion 25 and the supporting portion 135 abut against each other, the supporting portion 135 of the retainer 130 is sandwiched between the locking claws 29, 29 and the supporting portion 25 of the protector 20, and they are fixed to each other.
[Effects by Temperature Sensor 2]
According to the temperature sensor 2, the retainer 130 is made of a resin material with electrical insulation property. Therefore, according to the temperature sensor 2, the creepage distance to the lead wires 15, 15 can be extended, resulting in excellent voltage endurance performance as compared to the retainer 30 of the first embodiment.

Third Embodiment: FIGS. 8A to 8D

Next, a temperature sensor 3 according to a third embodiment will be described with reference to FIGS. 8A to 8D.
[Differences from First Embodiment]
While the retainer 30 according to the first embodiment is made of a metal material, a retainer 230 according to the third embodiment is made of a resin material. In addition, while the retaining portion 31 of the retainer 30 in the first embodiment retains the lead wires 15, 15 and the electrical insulation tube 17 of the sensor element 10 by pressure-bonding, the retainer 230 performs retention by pressing the thermosensitive body 11 against the inner surface of the closed end 21A of the protective tube 21. The retainer 230 having these features has the configurations described below.
[Characteristic Configurations of Temperature Sensor 3: FIGS. 8A to 8D]
As shown in FIG. 8D, the retainer 230 of the temperature sensor 3 performs retention by pressing the thermosensitive body 11 of the sensor element 10 against the inner surface of the closed end 21A of the protective tube 21.
The retainer 230 includes: a lead wire chamber 233 through which the lead wires 15, 15 penetrate and in which the lead wires 15, 15 are housed; a retaining tube 235 surrounding the lead wire chamber 233. In a state where the retaining tube 235 presses against the protective layer 13 of the sensor element 10, the lead wires 15, 15 are housed in the lead wire chamber 233, and the protective layer 13 abuts against the inner surface of the closed end 21A of the protective tube 21.
In the temperature sensor 3, the protective tube 21 is pressure-bonded to the retainer 230 in order to fix and retain the retainer 230 to the protector 20. Note that the lead wire chamber 233 may house the pair of lead wires 15, 15 together or may house the pair of lead wires 15, 15 separately.

[Procedure of Manufacturing Temperature Sensor 3: FIGS. 8A to 8D]

The temperature sensor 3 is manufactured in the following procedure.

Figure 8A:
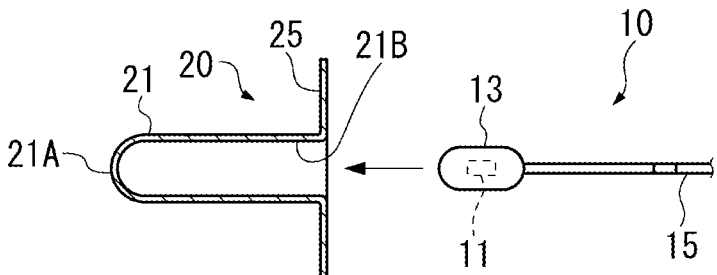
FIGS. 8A to 8D shows a procedure of manufacturing a temperature sensor according to a third embodiment of the present invention.
Figure 8B:
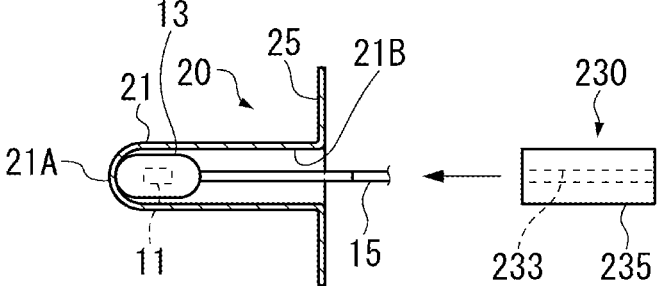

First, as shown in FIG. 8A and FIG. 8B, the sensor element 10 is inserted into the protective tube 21 of the protector 20. At this point, the protective layer 13 is not fixed yet.

Figure 8C:
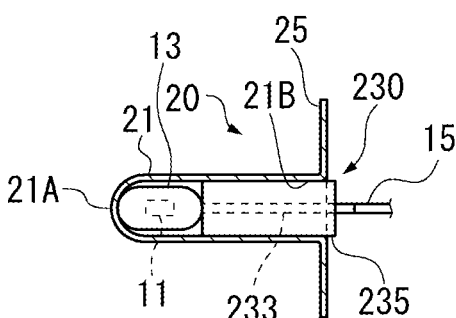
Figure 8D:
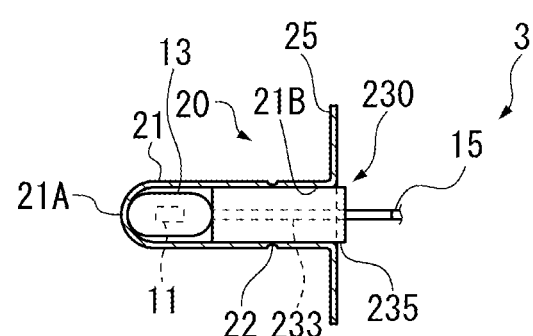

Next, as shown in FIG. 8B and FIG. 8C, the retainer 230 is assembled to the protector 20. This assembly is performed by inserting the retainer 230 into the protective tube 21 of the protector 20. During this insertion, alignment is performed such that the lead wires 15, 15 are arranged inside the lead wire chamber 233.

When the retainer 230 is inserted into the protective tube 21 to an innermost part where the retaining tube 235 is pressed against a rear end of the protective layer 13, further insertion is prevented.

When the retainer 230 is inserted to the innermost part, a pressure-bonding portion 22 is provided to squeeze the protective tube 21 along a circumferential direction from its outer peripheral surface to retain the protective tube 21 to the retainer 230, as shown in FIG. 8C and FIG. 8D. In this manner, the retainer 230 is fixed and retained to the protector 20.

[Effects by Temperature Sensor 3]

The temperature sensor 3 described above does not include the electrical insulation tube 17 of the sensor element 10 in the first embodiment, and instead uses the retainer 230 to retain the sensor element 10. Therefore, the temperature sensor 3 can have a simplified structure as compared to the first embodiment.

Fourth Embodiment: FIGS. 9A to 9D

Next, a temperature sensor 4 according to a fourth embodiment will be described with reference to FIGS. 9A to 9D.

[Differences from First Embodiment]

While the retainer 30 according to the first embodiment performs retention by pressure-bonding the lead wires 15, 15 of the sensor element 10 by the retaining portion 31, a retainer 330 performs retention by pressing the protective layer 13 including the thermosensitive body 11 against the inner surface of the closed end 21A of the protective tube 21. The retainer 330 having these features has the configurations described below.

[Characteristic Configurations of Temperature Sensor 4: FIGS. 9A to 9D]

As shown in FIGS. 9A to 9D, the retainer 330 of the temperature sensor 4 includes two members, i.e., a first member 331 and a second member 335.

The first member 331 directly presses the thermosensitive body 11 of the sensor element 10 against the inner surface of the closed end 21A of the protective tube 21. The first member 331 has a structure similar to the retainer 230 of the third embodiment, but is made of a ceramic material with electrical insulation property such as aluminum oxide or zirconium oxide.

The second member 335 presses the first member 331 against the inner surface of the closed end 21A and is fixed to the protector 20. The second member 335 has a structure similar to the retainer 130 of the second embodiment, but is made of a metal material.

The first member 331 includes: a lead wire chamber 333 through which the lead wires 15, 15 and the electrical insulation tube 17 penetrate and in which the lead wires 15, 15 and the electrical insulation tube 17 are housed; a first retaining tube 334 surrounding the lead wire chamber 333. In a state where the first retaining tube 334 presses the protective layer 13 of the sensor element 10 against the inner surface of the closed end 21A of the protective tube 21, the lead wires 15, 15 and the electrical insulation tube 17 are housed in the lead wire chamber 333, and the protective layer 13 abuts against a distal end of the first retaining tube 334.

The second member 335 includes: a retaining portion 336 contacting the first member 331 and performing retention by pressing the first member 331 against the inner surface of the closed end 21A; and a supporting portion 35 supporting the retaining portion 336. The retaining portion 336 includes: a lead wire chamber 337 through which the lead wires 15, 15 and the electrical insulation tube 17 penetrate; a second retaining tube 338 surrounding the lead wire chamber 337. In a state where the retaining portion 336 presses against the first member 331, the lead wires 15, 15 are housed in the lead wire chamber 337, and the first member 331 abuts against a distal end of the second retaining tube 338.

[Procedure of Manufacturing Temperature Sensor 4: FIGS. 9A to 9D]

The temperature sensor 4 is manufactured in the following procedure.

Figure 9A:
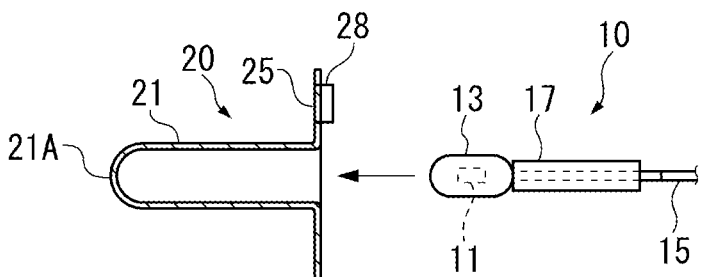
FIGS. 9A to 9D shows a procedure of manufacturing a temperature sensor according to a fourth embodiment of the present invention.
Figure 9B:
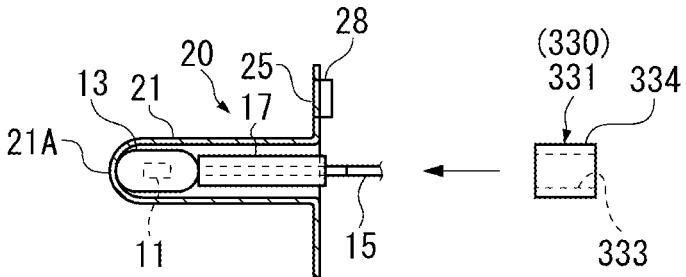

First, as shown in FIG. 9A and FIG. 9B, the sensor element 10 is inserted into the protective tube 21 of the protector 20. At this point, the protective layer 13 is not fixed yet.

Figure 9C:
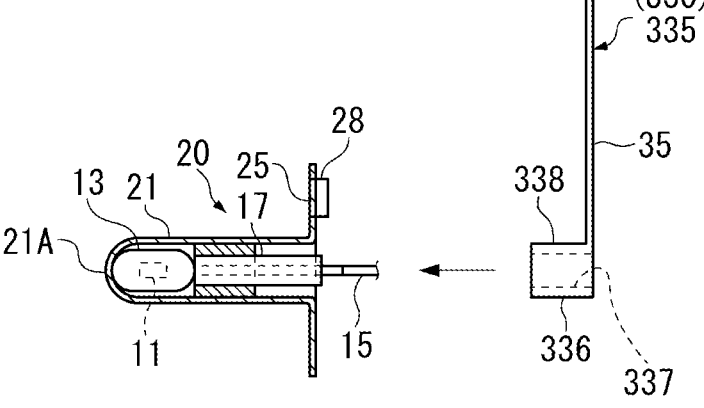
Figure 9D:
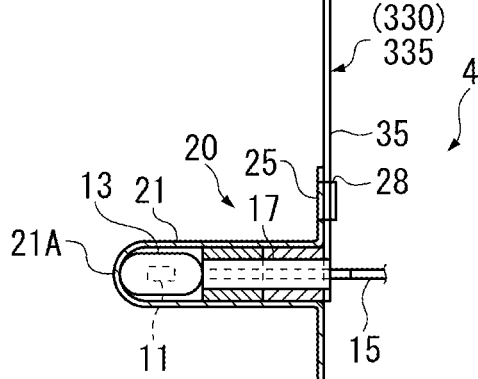

Next, as shown in FIG. 9B and FIG. 9C, the first member 331 is assembled to the protector 20. This assembly is performed by inserting the first member 331 into the protective tube 21 of the protector 20. During this insertion, alignment is performed such that the lead wires 15, 15 and the electrical insulation tube 17 are housed inside the lead wire chamber 337.

When the second retaining tube 338 is inserted into the protective tube 21 to an innermost part where second retaining tube 338 of the second member 335 is pressed against a rear end of the first member 331, the supporting portion 25 of the protector 20 and the supporting portion 35 of the retainer 330 abut against each other, and further insertion is prevented.

[Effects by Temperature Sensor 4]

In the temperature sensor 4 described above, the retainer 330 includes the first member 331 made of ceramic and the second member 335 made of metal. Therefore, the first member 331, which is at a position close to the protective layer 13 including the thermosensitive body 11, is made of ceramic with electrical insulation property. Therefore, according to the temperature sensor 4, the creepage distance to the lead wires 15, 15 can be extended, resulting in excellent voltage endurance performance as compared to the retainer 30 of the first embodiment. Moreover, the temperature sensor 4 has excellent heat resistance since the second member 335 is made of a metal material.

Besides the above description, the configurations of the above embodiments can be selected or replaced with other configurations as appropriate, without departing from the spirit of the present invention.

For example, although in the first embodiment the fixation of the supporting portion 25 and the supporting portion 35 is performed by sandwiching by the locking claws 29, 29 provided on the supporting portion 25, which is an example of mechanical retention, the present invention is not limited thereto. For example, a U-shaped locking claw formed separately from the supporting portion 25 and the supporting portion 35 may be provided so that the supporting portion 25 and the supporting portion 35 laminated are sandwiched by the U-shaped locking claw.

In addition, although in the third embodiment the pressure-bonding portion 22 is provided by squeezing the protective tube 21 after inserting the retainer 230, which is another example of mechanical retention, the present invention is not limited thereto. For example, the pressure-bonding portion 22 may be provided by squeezing the protective tube 21 before inserting the retainer 230 and the retainer 230 may be inserted there.

REFERENCE SIGNS LIST 1, 2, 3, 4 temperature sensor
10 sensor element
11 thermosensitive body
13 protective layer
15 lead wire
17 electrical insulation tube
20 protector
21 protective tube
21A closed end
21B open end
25 supporting portion (first supporting portion)
26 supporting piece
27 peripheral edge
28 retaining piece
29 locking claw
30 retainer
31 retaining portion
32 connecting piece
33 retaining piece
35 supporting portion (second supporting portion)
130 retainer
131 retaining portion
133 retaining tube
133A lead wire chamber
133B tube
230 retainer
233 lead wire chamber
235 retaining tube
330 retainer
331 first member
333 lead wire chamber
334 first retaining tube
335 second member
336 retaining portion
337 lead wire chamber
338 second retaining tube
C central axis

The invention claimed is:

1. A temperature sensor comprising:
a sensor element comprising a thermosensitive body, a protective layer made of glass and surrounding the thermosensitive body, and a lead wire electrically connected to the thermosensitive body;
a protector comprising a protective tube in which the thermosensitive body is housed; and
a retainer mechanically retaining a position of the thermosensitive body relative to the protective tube inside the protective tube,
wherein the sensor element comprises an electrical insulation tube covering the lead wire, and the retainer fixes the position of the thermosensitive body relative to the protective tube by retaining the electrical insulation tube by pressure-bonding,
wherein the protector is made of a metal material and comprises the protective tube and a first supporting portion continuous to a proximal end of the protective tube having an opening, and
wherein the retainer is made of a metal material and comprises a retaining portion that retains the electrical insulation tube by pressure-bonding and a second supporting portion supporting the retaining portion.

2. The temperature sensor according to claim 1, wherein the retainer is pressed against the protective layer that surrounds the thermosensitive body housed inside the protective tube and includes the thermosensitive body.

3. The temperature sensor according to claim 2, wherein the retainer comprises a retaining tube made of an electrically insulating material provided inside the protective tube and penetrated by the lead wire and the retaining tube is pressure-bonded to the protective tube.

4. A temperature sensor comprising:
a sensor element comprising a thermosensitive body, a protective layer made of glass and surrounding the thermosensitive body, and a lead wire electrically connected to the thermosensitive body;
a protector comprising a protective tube in which the thermosensitive body is housed; and
a retainer mechanically retaining a position of the thermosensitive body relative to the protective tube inside the protective tube,
wherein the sensor element comprises an electrical insulation tube covering the lead wire, and the retainer fixes the position of the thermosensitive body relative to the protective tube by retaining the electrical insulation tube by pressure-bonding,
wherein the retainer is pressed against the protective layer that surrounds the thermosensitive body housed inside the protective tube and includes the thermosensitive body, and
wherein the protector is made of a metal material and comprises the protective tube and a first supporting portion continuous to a proximal end of the protective tube having an opening, and the retainer is made of a resin material and comprises a retaining portion pressed against the protective layer that surrounds the thermosensitive body and a second supporting portion supporting the retaining portion and integrally formed with the retaining portion.

5. A temperature sensor comprising:
a sensor element comprising a thermosensitive body, a protective layer made of glass and surrounding the thermosensitive body, and a lead wire electrically connected to the thermosensitive body;
a protector comprising a protective tube in which the thermosensitive body is housed; and
a retainer mechanically retaining a position of the thermosensitive body relative to the protective tube inside the protective tube,
wherein the sensor element comprises an electrical insulation tube covering the lead wire, and the retainer fixes the position of the thermosensitive body relative to the protective tube by retaining the electrical insulation tube by pressure-bonding, wherein the retainer is pressed against the protective layer that surrounds the thermosensitive body housed inside the protective tube and includes the thermosensitive body, and wherein the protector is made of a metal material and comprises the protective tube and a first supporting portion continuous to a proximal end of the protective tube having an opening, the retainer comprises a first member and a second member, the first member comprises a first retaining tube pressed against the protective layer that surrounds the thermo-sensitive body, and the second member comprises a second retaining tube pressing the first retaining tube against the protective layer and a second supporting portion supporting the second retaining tube.

* * * * *